United States Patent [19]

Hendrickson et al.

[11] Patent Number: 5,135,725

[45] Date of Patent: Aug. 4, 1992

[54] OZONE GENERATOR EQUIPMENT AND METHODS

[75] Inventors: Richard J. Hendrickson, Richmond, Va.; Kenneth G. Kafer, New Berlin, Wis.

[73] Assignee: Infilco Degremont Inc., Richmond, Va.

[21] Appl. No.: 393,659

[22] Filed: Aug. 14, 1989

[51] Int. Cl.⁵ .............................................. B01J 19/08
[52] U.S. Cl. ........................ 422/186.15; 422/186.21; 204/176; 315/170
[58] Field of Search ............... 422/186.15, 186.07, 422/186.21; 204/176; 315/170

[56] References Cited

U.S. PATENT DOCUMENTS

| | | | |
|---|---|---|---|
| 3,784,838 | 1/1974 | Lowther | 250/536 |
| 4,027,169 | 5/1977 | Lowther | 250/536 |
| 4,385,261 | 5/1983 | Kogelschatz et al. | 315/170 |
| 4,461,744 | 7/1984 | Erni et al. | 422/186.18 |
| 4,495,043 | 1/1985 | Marets | 204/176 |
| 4,680,694 | 7/1987 | Huynh et al. | 363/136 |
| 4,790,980 | 12/1988 | Erni et al. | 422/186.15 |

Primary Examiner—Robert L. Stoll
Assistant Examiner—Nina Bhat
Attorney, Agent, or Firm—Carroll F. Palmer

[57] ABSTRACT

A current source inverter power supply for an ozone generator which results in improved efficiency and reliability in operation of such generators has an AC/DC converter coupled through a large inductance to a DC/AC inverter that, in turn, is coupled at its output to the primary of a high voltage transformer. Such transformer has an air gap in its core to supply the electrical characteristics necessary for resonance with the load which is capacitive in nature. Thyristors in the inverter are naturally commutated so the switching frequency is close to, but slightly above, the natural resonant frequency of the inverter/transformer/ozone generator circuit.

8 Claims, 3 Drawing Sheets

OZONE GENERATOR EQUIPMENT AND METHODS

BACKGROUND OF THE INVENTION

1. Field Of The Invention

This invention relates to ozone generators and methods. More particularly, it concerns power supplies applicable to ozone generators, especially those using tubular electrodes, and methods of generating ozone therewith.

2. Discussion Of The Prior Art

Industrial ozone generators using tubular electrodes are usually composed of a set of elementary generators connected in parallel within the same enclosure, each generator comprising two conducting electrodes separated by a narrow gap, through which a gas is passed, and a dielectric material, usually glass. These electrodes are concentric. Inside an outer metal electrode, around which cooling water circulates, a glass tube is placed. The glass tube is closed at one end and metalized internally, such metalization constituting the second electrode. A small discharge gap, e.g., 1-2 mm, is provided between the glass tube and the metal tube through which is passed either pure oxygen or a gaseous mixture, such as atmospheric air containing oxygen.

Between the two electrodes an increasing alternating potential difference, which is above a specified voltage corresponding to the breakdown voltage of the gas, is applied across the terminals of the generator. There appears in the discharge gap a violet corona resulting in the partial conversion of oxygen into ozone. Ozone forms when oxygen molecules are accelerated and collide in an alternating electric field. This formation only occurs when there is a voltage gradient and the electric field has reached the necessary strength to ionize the gas.

Ozone production by such generators is an increasing function of the electrical power applied thereto and the control of the production at the required value is, therefore, effected by adjusting said power.

In the past, significant refinements have been made to ozone generators and their integral power supplies. These refinements have been directed at increasing the efficiency of the generator or the power supply.

It is known that an ozone generator can be powered by a supply consisting of a saturable core reactor and an air gap transformer. This method as disclosed in U.S. Pat. No. 4,587,591 at line frequency, 50 or 60 hertz.

It is also known that the efficiency of an ozone generator can be increased by increasing the power supply frequency above the commercial AC line frequency. However, there is a maximum practical level for the frequency. In the past, these medium (50 to 1,000 hz) and high (above 1,000 hz) frequency power supplies have been voltage fed inverters. Since the power to each of the tubes must be controlled and the start of the corona is voltage dependent, it was obvious to adjust the voltage of the electric field. These power supplies have either had natural or forced commutation. The latter method is taught in U.S. Pat. Nos. 4,680,694 and 4,713,220.

Industrial generators which are made up of multiple elementary generators inherently have a large amount of stored energy which could feed through to one elementary generator in the case of a short circuit (broken dielectric tube). It is good engineering practice to fuse each dielectric tube to protect against short circuits.

Since the voltage source inverter supplies a voltage waveform to the load, the current is uncontrolled and determined by the load. Under faulting conditions of the load itself (ozone generator-broken dielectric tube), the resulting electrical short of the load will cause the current as supplied by the power supply to rapidly increase to uncontrolled destructive levels. This will result in a failure to commutate (turn-off) an inverter thyristor which then results in an internal short circuit within the inverter itself. This short circuit appears across the very large capacitor bank on the dc link which further results in fault currents. Thus, under faulting conditions of the load, a short circuit can cause uncontrolled destructive levels of currents to flow.

In order to shut down a voltage source inverter power supply under faulting conditions, the firing pulses to the inverter thyristors must stop. The current left flowing in the devices is influenced by the fault currents described above. In practice various types of protective schemes have been devised to self protect the voltage source inverter power supply, but each has some disadvantage. The result is that these schemes are only marginally successful and involve power components which result in additional circuit losses that result in lower efficiencies.

The major disadvantage of the voltage source power supply is its unreliability in not being able to control currents. This type of power supply conventionally has been air-cooled which limits operating the thyristor to near its full current rating. This method of cooling also opens the equipment cabinet to the environment and increases maintenance costs. Such prior art power supplies make use of several electromagnetic elements that have considerable weight and occupy a great deal of space. They are also relatively expensive.

The present invention provides improvements in the structuring and operation of ozone generators to mitigate or eliminate the defects of prior known devices as discussed above.

It is known that ozone generators can be powered by a current source inverter, compensation reactor and a high voltage transformer (see U.S. Pat. No. 4,790,980). This present invention make it possible to eliminate the need for a separate compensation reactor.

OBJECTS

A principal object of the invention is the provision of more reliable and more economical ozone generators.

Further objects include the provision of:

1. Improved ozone generators that utilize a current fed inverter power supply which includes an air-gap high voltage transformer providing the necessary electrical characteristics for resonance with the load.

2. Such generators that, under faulting load conditions, prevent a short circuit from causing uncontrolled destructive levels of currents to flow.

3. Improved ozone generation methods that are more reliable and economical than prior known methods.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by providing ozone generators with a current source power supply, whereby the power supply only supplies a controlled output current waveform to the load. The voltage is uncontrolled and determined by the load. As a result, under faulting conditions of the load, a short circuit cannot cause uncontrolled destructive levels of currents to flow.

An improved power supply of this invention comprises a controlled AC/DC three-phase bridge rectifier coupled through two current filter reactors to a DC/AC thyristor inverter. The inverter is then coupled to the primary of an air gap high voltage transformer. The ozonator load is a capacitive load, and of a low power factor and is electrically characterized as a dielectric capacitance in series with the parallel combination of the air gap capacitance and an avalanche diode whose breakdown voltage is the same as the corona threshold voltage. The power supply operates at a frequency dependent on the parallel resonant frequency of an air gap transformer in parallel with the reflected load capacitance.

In the current fed inverter of the invention, the d.c. supply is of high impedance because of the presence of d.c. filter reactors. Therefore, the output current waveform is held constant by this inductance while the output voltage waveform depends upon the nature of the load impedance. The output waveform and the power can be maximized through the use of a natural resonant circuit. An air gap in the iron core of the high voltage transformer supplies the necessary high impedance for resonance. Therefore, the invention provides great improvement in power supplies for ozone generators and eliminates the need for a separate high impedance electromagnetic element from the circuit as required in prior known devices.

In accordance with the invention, to shutdown the current source power supply under faulting conditions, all inverter thyristors are gated to an "on" condition deliberately shorting the output terminals of the power supply and placing a short on the dc link of the power supply. In this manner, the rate of rise of fault current is limited by the very large, current filter, inductive reactance on the dc link. As such, the slow rate of rise of dc link current merely needs monitoring of the "turn off" time and when out of range of shutting down the ac-dc rectifier on the mains. In accordance with the invention, power supply short circuit protection is accomplished by monitoring the waveform turn-off time every half cycle and comparing it against what is required. If these do not agree the inverter thyristors are fired full on and the rectifier thyristors are turned off. When the fault has cleared the circuit resumes normal operation.

Providing the generator with a source of cooling water, and designing all thyristor bridges and electromagnetics to be water-cooled has significantly reduced the size and weight of protective cabinets, deleted the maintenance cost of replacing or cleaning air filters, and reduced the size and cost of the thyristors for a particular power requirement as compared to air-cooled thyristors.

BRIEF DESCRIPTION OF THE DRAWINGS

A more complete understanding of the invention can be obtained by reference to the accompanying drawings in which.

DESCRIPTION OF PREFERRED EMBODIMENTS

Figure 1:
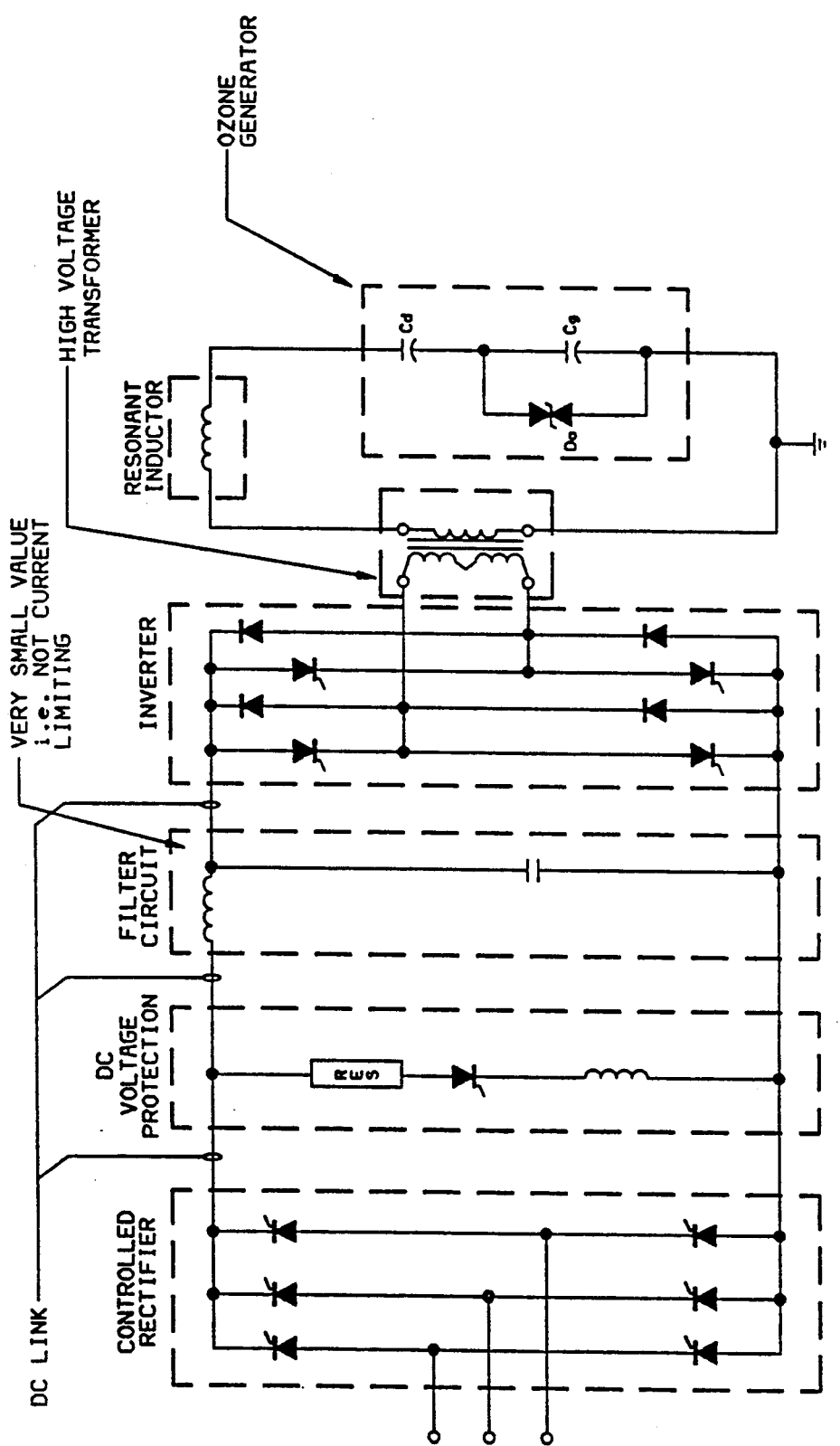
FIG. 1 is a schematic circuit diagram of a prior art device, for the generation of ozone, which is supplied by a voltage source inverter.
Figure 2:
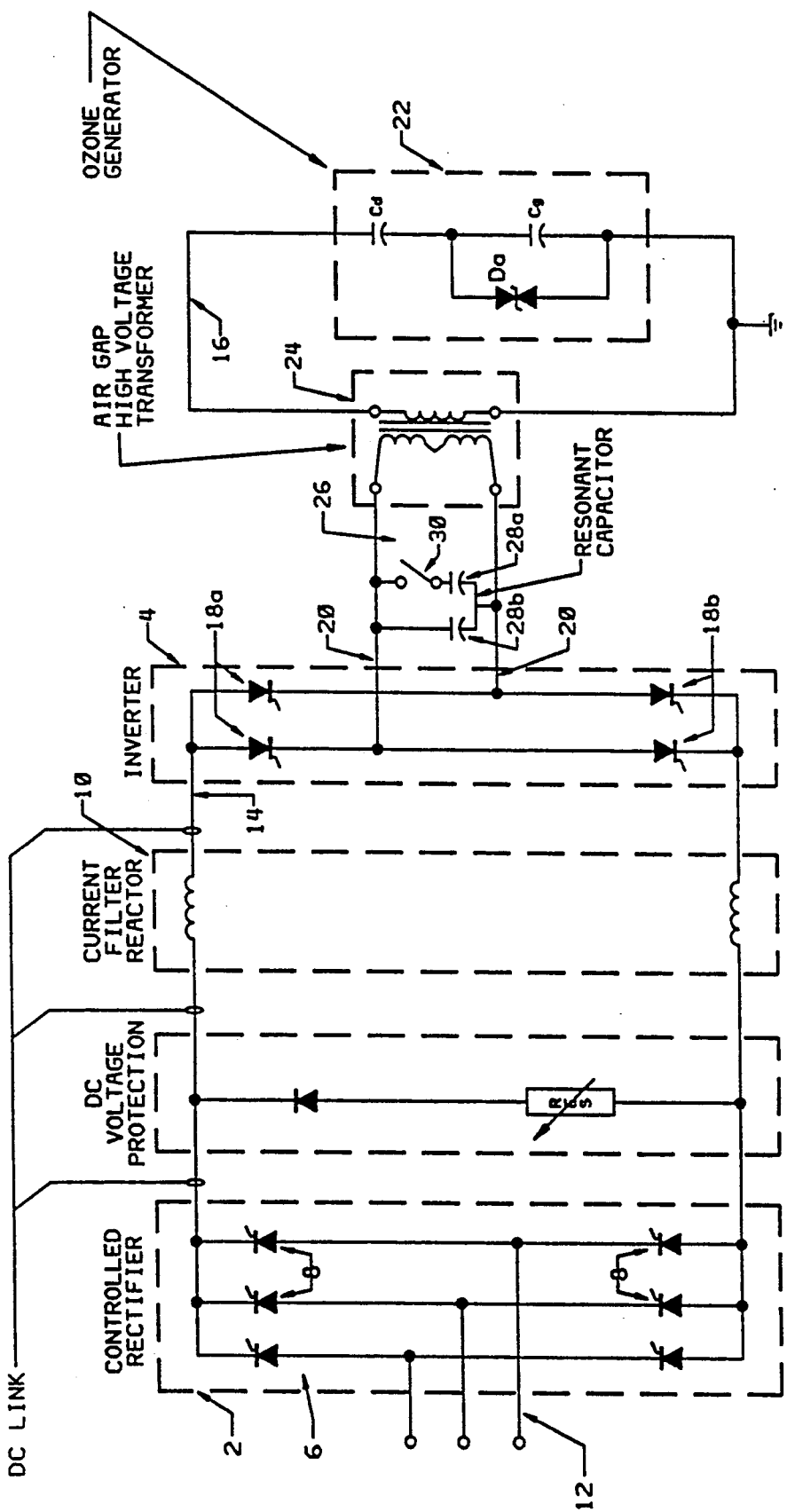
FIG. 2 is a schematic circuit diagram of a device in accordance with the invention, for the generation of ozone, which is supplied by a current source inverter.
Figure 3A:
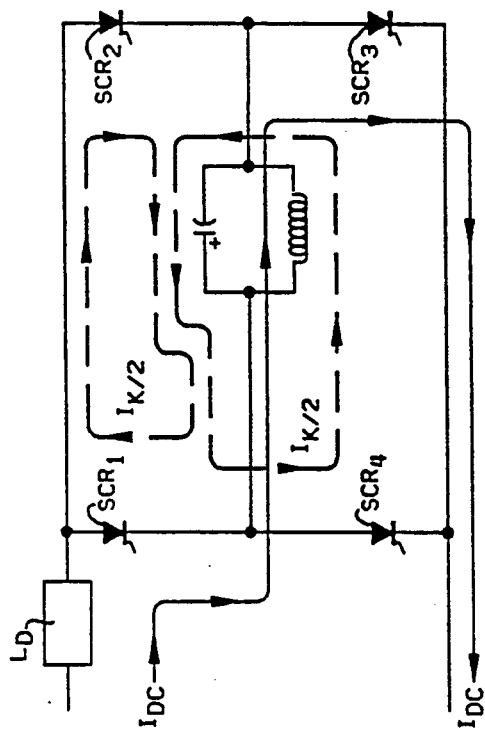
FIGS. 3(A-D) comprise four schematic circuit diagrams for the explanation of the four conditions of inverter operation in accordance with the invention.
Figure 3B:
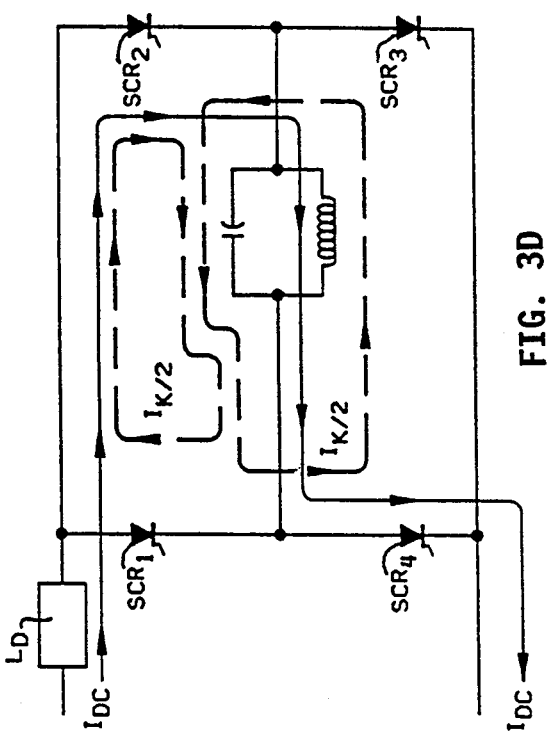
Figure 3C:
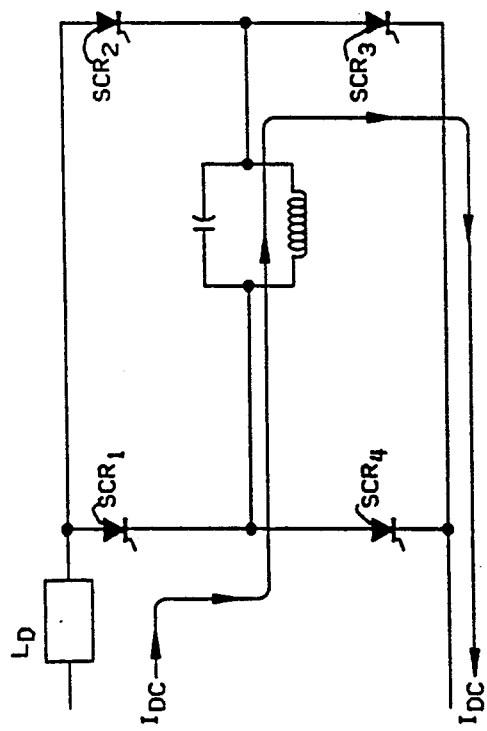
Figure 3D:
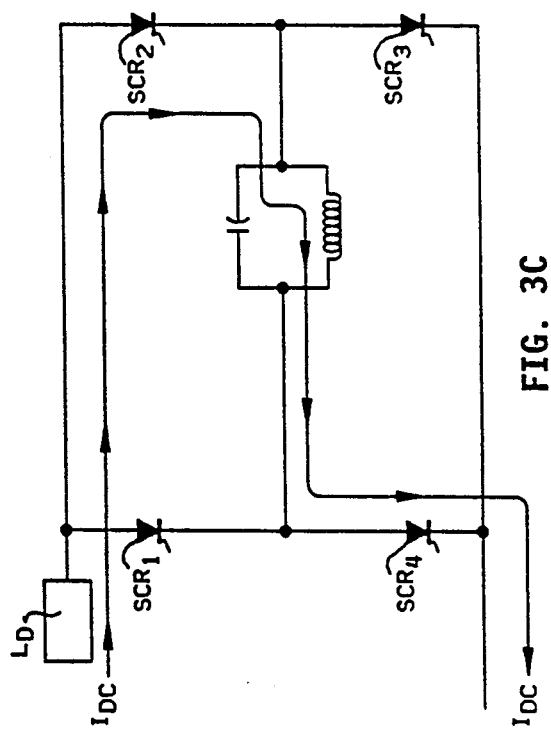

As shown in FIG. 2, the dc current source 2 for the inverter 4 comprises a pulse, fully controlled, phase-controlled bridge rectifier 6 (converter), preferably formed of thyristors, in this case silicon controlled rectifiers (SCRs) 8, in conjunction with a large inductive filter reactor 10, which converts the input ac voltage of three phase line 12 to controllable direct current. The magnitude of the constant dc current supplied to the inverter 4 can be continuously controlled through phase delay of the firing pulses supplied to the rectifier SCR's 8.

The purpose of the controllable dc current source 2 is twofold. First, it provides a means for continuously controlling the inverter output high frequency voltage and power. Secondly, it provides a rapid means for controlling and limiting the input current to the inverter (and hence also the current drawn from the three phase lines). On switching off the system, the ac bridge rectifier 6 thyristor gate control signals are reversed so that the energy stored in the rectifier current filter reactor is fed back to the ac three phase line 12. Thus, a very rapid means of protection is provided against overload and fault conditions.

If an inverter or load short circuit fault should arise, the large dc filter reactor 10 so limits the rate of rise of the direct current that sufficient time is available for the over current trip to switch off the power supply long before an unacceptable high level of fault current is achieved. The magnitude of the constant current that flows, on the dc link 14, through the large inductive reactance 10 establishes the power supplied to the inverter 4.

The inverter changes the dc current to alternating square wave current to the load circuit 16 which altogether forms a parallel resonant circuit The thyristors 18a and 18b used in the inverter 4 are specially selected to have a fast turn-on time and high di/dt characteristics, fast turn-off time and high dv/dt recovery characteristics. These requirements are necessary to enable the thyristors to switch at frequencies used.

The dc-ac inverter 4 consists of a fully controlled single phase bridge. By gating the SCR's 18 of the bridge diagonals in turn, constant current of alternate polarity is supplied to the load circuit 16, which is composed of the air gap high voltage transformer 24 and the ozone generator 22 that form a parallel resonant circuit. Hence, the inverter is a constant current source. The frequency is determined by the load voltage buildup on a parallel resonant circuit. Thus, the dc-ac inverter is carried on load and the frequency of operation will merely follow and track the natural parallel resonant circuit frequency. In this manner the output power factor for a given operating condition is at all times at a maximum value.

The basic principle of the current source type inverter is explained by reference to the circuit shown in FIG. 2, a constant and essentially smooth current is supplied to the inverter 4 from dc source 2 through the dc filter reactor 10. This constant direct current is switched in opposite directions through the output circuit by alternating firing SCR pairs 18a and 18b. The resulting output current has an essentially square waveform and each SCR conducts for a period corresponding to half the total output cycle time. This output voltage at the inverter terminals 20 assumes whatever waveshape is appropriate in response to the rectangular current waveform supplied to the load.

Without an applied load, the inverter 4 itself does not supply any output voltage. It only supplies the output current. Two basic conditions of the output load circuit must be satisfied. First, the phase angle of the load at the fundamental output frequency must appear leading by an amount sufficient to ensure successful commutation of the current from one pair of SCR's to the other. Secondly, the impedance of the output circuit to the higher order harmonics of the rectangular current waveform must be relatively low.

For the ozone generator 22, the load is capacitive, of a low power factor and requires higher voltages than an inverter 4 by itself can supply. In this case, the high voltage transformer 24 is manufactured with an air gap in the iron core to correct the load's power factor to near unity without the need of an additional inductor for resonance. This will then maximize the reactance loading of the power supply. Finally, since it is desirable for the high voltage output waveform to be near sinusoidal in the presence of a square wave of current from the inverter section, the Q factor of the L-C tuned circuit 26 must be sufficiently high to filter out the higher order harmonics of the current square waveform supplied by the inverter 4. Therefore, additional capacitance in the form of capacitors 28a and 28b are added to the tuned L-C circuit to provide for the necessary Q factor. The capacitor 28a is connected to the taps of switch 30 to allow for trimming the resonant frequency based on the actual amount of capacitance of the ozone generator 22. This capacitance can change based on the amount of dielectric tubes removed from service due to blown fuses. This trim is only necessary to the extent that the operating frequency be held relatively constant.

It is necessary only for the combined values of the capacitors 28a and 28b to be such as to "overcompensate" the inductive reactance of the air gap high voltage transformer 24 at the operating frequency and thereby present an overall leading power factor to the inverter.

During normal bridge operation, four conditions are to be considered. During condition 1 (FIG. 3,A) the SCR's 1 and 3 are carrying the constant dc link current, Idc, to the load. During condition 2 (FIG. 3,B), which is the commutation phase for SCR's 1 and 3, SCR's 2 and 4 are fired while the resonant circuit capacitance of ozone generator 22 has the polarity as shown.

A rapidly rising commutation current Ik/2 is generated by the voltage on the resonant circuit capacitance. The rise time of this commutation current is only limited by the circuit inductance of the air gap high voltage transformer 24. This commutation current Ik/2 is of opposite direction to the current flow $I_{DC}$ in SCR's 1 and 3 which are extinguished and the dc link current, Idc, therefore changes over from SCR's 1 and 3 to SCR's 2 and 4.

Since the inductance of the dc link current filter reactor LD is very large, during the commutation interval, the dc link current cannot change magnitude and is therefore constant. The commutation phase must be completed in time before the resonant circuit capacitance voltage has reduced to zero and switched voltage polarity. The time interval from the completion of the commutation phase until the resonant circuit capacitance voltage has reduced to zero must be equal to or greater than the minimum turn off time requirements of the inverter SCR's.

After the commutation phase of condition 2 is complete, SCR's 2 and 4 are carrying the constant dc link current, $I_{DC}$, to the load as shown in condition 3 (FIG. 3,C). The direction of current is opposite to that of condition 1. During condition 4 (FIG. 3,D), the dc link current $I_{DC}$ is commutated from SCR's 2 and 4 to SCR's 1 and 3.

The process is as described for condition 2. Therefore the cycle is complete and operation during condition 1 is again obtained. As the SCR'S are fired before each voltage zero, the rectangular current waveform is leading the near sinusoidal voltage waveform on the output of the inverter. This gives a leading power factor to the medium frequency circuit which means that the inverter is running at a slightly higher frequency than the natural resonant frequency of the tank circuit. As the resonant frequency of the tank circuit changes due to changes in the load conditions, the inverter will adjust its frequency to maintain the correct turn off time.

The firing pulses for the inverter SCR'S are fed from the electronic controls to gating circuits mounted adjacent to the SCR'S. The basis for the protection against overload and faults of the ozone generator is as follows.

The control for the inverter monitors the circuit reverse voltage available for the "turn off time" of the SCR'S. This turn off time is provided by the resonant load on the inverter operating with a leading power factor. That is, the inverter switches polarity of or reverses the output current before the load voltage reverses polarity. During operation, the circuit available turn off time is monitored for each inverter thyristor. If any interval of turn off time is less than specified, all inverter SCR'S are immediately "gated on", placing a short at the output of the large dc link reactor. This short creates a slow rate of rise of the dc link current which the control for the ac to dc rectifier senses and shuts down the system.

Gating all inverter SCR'S on during faulting conditions is the safest condition for the SCR'S to be in. The SCR'S are "on", hence they cannot be overvoltaged. While they are "on" and the current through them limited and controlled by the large current filter reactor 10 on the dc bus, they cannot be subjected to over current values.

In constructing equipment in accordance with the invention and carrying out its novel methods for the generation of ozone, one may use commercially available rectifiers and current source inverters as described along 18 with basic designs in such publications as the 6th edition of the SCR MANUAL by General Electric. The present invention with such a current source inverter utilizes a technique of generator power factor correction with an air gap high voltage transformer to increase reliability and economy of operation in ozone generation.

By way of example of a specific embodiment of the invention, the total capacitance for a small industrial ozone generator 22 would be 0.434 micro farads. The maximum inverter output voltage (Vp) is 800 volts and the generator maximum voltage (Vs) is 10,000 volts.

The turns ratio of the high voltage transformer 24 would be 0.08 through the use of the transformer turns ratio equation $a = V_p/V_s$. In order to calculate the reactance necessary to correct the ozone generator's power factor, the generator capacitance will be referred to the primary side of the air gap high voltage transformer 24. The required transformer impedance is calculated using the transformer impedance referral equation $Z_p = a^2 Z_s$, where $Z_p$ is the transformer primary impedance, "a" is the transformer turns ratio and "$Z_s$" is the transformer secondary impedance. The equation for the impedance of a capacitive circuit is $Z = 0.1592/fC$, where "f" is the frequency measured in hertz and "C" is the capacitance measured in micro farads. By combining these two equations, setting "f" at 600 and solving for the capacitance as referred to the primary of the transformer, the capacitance is calculated to be 68 micro farads.

Although a range of frequencies is possible, it is advantageous to achieve a frequency of 600 hz at maximum current.

Using the standard resonance equation $f = 0.1592/(LC)^{0.5}$, wherein "L" is the inductance measured in micro henries, "f" and "C" are as stated above and taking into consideration manufacturing limitations, one can fabricate a transformer which has a 950 micro henries air gap inductance for use in the stated ozone generator.

To achieve a frequency of 600 hz at maximum current, the power supply is tuned to a frequency of 580 hz using the resonant capacitor 28. Such capacitor permits an increase in the Q factor of the output circuit and thereby provides a near sinusoidal waveform current to be passed to the ozone generator 22. The resonant capacitor 28 is sized using the resonance equation to be 11.5 micro farads.

The protective control arrangements of the invention provide for automatic system restart after a fault has occurred by reapplying the SCR gate control signals after a short delay has occurred. In this manner, as an individual dielectric tube in the ozone generator becomes damaged, the resulting short circuit arc over will cause a rise in current sensed by the SCR "turn off time" monitor circuit as a minimum or zero turn off time interval shutting down the system by turning "on" all inverter SCR'S as described.

THE EMBODIMENTS OF THE INVENTION IN WHICH AN EXCLUSIVE PROPERTY OR PRIVILEGE IS CLAIMED ARE DEFINED AS FOLLOWS:

1. A current source power supply circuit for an ozone generator comprising:
    an AC/DC rectifier coupled at its output through a filter choke to the input of a DC/AC inverter, the output of which supplies current to a resonant network and
    said resonant network comprises an air gap high voltage transformer having its primary coupled to said output of said inverter and its secondary coupled to said ozone generator.

2. A current source power supply circuit as claimed in claim 1 wherein said rectifier is a thyristor bridge rectifier and said inverter is a thyristor bridge inverter.

3. A current source power supply circuit as claimed in claim 1 wherein a variable capacitance couples said output of said inverter to said primary of said transformer.

4. A current source power supply circuit as claimed in claim 3 wherein said variable capacitance is automatically switched based on the state of said ozone generator.

5. A current source power supply circuit as claimed in claim 2 comprising protective control means that monitors each inverter thyristor turn off time and gates all thyristors on when said turn off time is less than a predetermined value.

6. A current source power supply circuit as claimed in claim 5 which restarts automatically after a fault shutdown.

7. A current source power supply circuit as claimed in claim 1 wherein said bridge rectifier regenerates stored energy back to said circuit upon shutdown.

8. A current source power supply circuit as claimed in claim 1 wherein at least one of said rectifier, said inverter, said high voltage transformer, said filter choke, or said variable capacitor is water-cooled.

* * * * *